United States Patent
Hosomizo

(10) Patent No.: US 11,861,252 B2
(45) Date of Patent: Jan. 2, 2024

(54) NON-TRANSITORY COMPUTER-READABLE RECORDING MEDIUM CONTAINING COMPUTER-EXECUTABLE INSTRUCTIONS WHICH CAUSES INFORMATION PROCESSING DEVICE TO CONTROL PRINTER CONNECTED THERETO

(71) Applicant: BROTHER KOGYO KABUSHIKI KAISHA, Nagoya (JP)

(72) Inventor: Yoshito Hosomizo, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/575,040

(22) Filed: Jan. 13, 2022

(65) Prior Publication Data
US 2022/0229614 A1    Jul. 21, 2022

(30) Foreign Application Priority Data

Jan. 15, 2021 (JP) .................................. 2021-004722
Jan. 15, 2021 (JP) .................................. 2021-004724

(51) Int. Cl.
G06F 3/12    (2006.01)

(52) U.S. Cl.
CPC .......... *G06F 3/1255* (2013.01); *G06F 3/1207* (2013.01); *G06F 3/1238* (2013.01); *G06F 3/1239* (2013.01); *G06F 3/1256* (2013.01); *G06F 3/1293* (2013.01)

(58) Field of Classification Search
CPC .... G06F 3/1255; G06F 3/1207; G06F 3/1238; G06F 3/1239; G06F 3/1256; G06F 3/1293; G06F 2206/1506; G06F 3/1222; G06F 3/1285
USPC ....................................................... 358/1.14
See application file for complete search history.

(56) References Cited

U.S. PATENT DOCUMENTS

| | | | | |
|---|---|---|---|---|
| 2007/0150299 | A1* | 6/2007 | Flory ...................... | H04L 63/20 |
| | | | | 705/344 |
| 2013/0120796 | A1* | 5/2013 | Watariuchi ............ | G06F 3/1288 |
| | | | | 358/1.15 |
| 2019/0235811 | A1* | 8/2019 | Kobayashi ............ | G06F 3/1263 |
| 2020/0314287 | A1 | 10/2020 | Kawamura et al. | |

FOREIGN PATENT DOCUMENTS

| | | |
|---|---|---|
| JP | 2017-156980 A | 9/2017 |
| JP | 2020-166676 A | 10/2020 |

* cited by examiner

*Primary Examiner* — Darryl V Dottin
(74) *Attorney, Agent, or Firm* — Scully, Scott, Murphy & Presser, PC

(57) ABSTRACT

A supporting program corresponding to the printer causes an information processing device to obtain user identification information and a usage condition associated with the user identification information when a general-use printing program receives a print instruction. The usage condition is a condition that determines whether printing is executable by a printer. The supporting program determines whether the printing is executable by the printer based on print settings of the print instruction and the obtained usage condition.

17 Claims, 13 Drawing Sheets

| USER NAME | USER ID | USAGE CONDITION | | |
|---|---|---|---|---|
| | | NUMBER OF SHEETS | COLOR/MONOCHROMATIC | TONER SAVE |
| A | 1001 | 50 | MONCHROMATIC | ON |
| B | 1002 | 100 | COLOR AND MONOCHROMATIC | ON |
| C | 1003 | 80 | MONCHROMATIC | ON·OFF |
| D | 1004 | UNLIMITED | COLOR AND MONOCHROMATIC | ON·OFF |

FIG. 2

NON-TRANSITORY COMPUTER-READABLE RECORDING MEDIUM CONTAINING COMPUTER-EXECUTABLE INSTRUCTIONS WHICH CAUSES INFORMATION PROCESSING DEVICE TO CONTROL PRINTER CONNECTED THERETO

CROSS-REFERENCE TO RELATED APPLICATIONS

This application claims priority under 35 U.S.C. § 119 from Japanese Patent Applications No. 2021-004722 and No. 2021-004724 both filed on Jan. 15, 2021. The entire subject matters of the applications are incorporated herein by reference.

BACKGROUND

The present disclosures are related to a non-transitory computer-readable recording medium containing computer-executable instructions which cause, when executed by a computer of an information processing device, the information processing device to control a printer connected to the information processing device.

SUMMARY

In recent years, a technology to control a printer by means of a standard printing program embedded in an OS (operating system) of a PC (personal computer) without using a printer driver has been put into practical use. In this technology, the OS associates the printer with the standard OS printing program, and thereafter, when print instructions are received for the printer, printing according to the standard OS printing program can be performed without using a printer driver.

According to aspects of the present disclosures, there is provided a non-transitory computer-readable recording medium for an information processing device having a computer. The information processing device is connectable to a printer. The computer-readable recording medium contains computer-executable instructions realizing a supporting program corresponding to the printer. When a print instruction making the printer to print an image is received from an application program implemented in the information processing device for a general-use printing program embedded in an operating system of the information processing device, the computer-executable instructions can cause, when executed by the computer, the information processing device to perform an identification information obtaining process of obtaining identification information which identifies a user, a usage condition obtaining process of obtaining a usage condition associated with the obtained identification information, the usage condition being a condition that determines whether printing is executable by the printer, the usage condition being set by the user, when receiving a print instruction, a determination process of determining whether the printing is executable by the printer based on print settings of the print instruction and the obtained usage condition.

BRIEF DESCRIPTION OF THE DRAWINGS

FIG. 2 shows an example of a data structure of the usage condition.

DETAILED DESCRIPTION OF THE EMBODIMENTS

Hereinafter, referring to the accompanying drawings, a personal computer (hereinafter referred to as a "PC") using a supporting program according to the present disclosures will be described in detail. The present specification discloses a support program executed by a PC connected with a printer having a printing function.

First Embodiment

Figure 1:
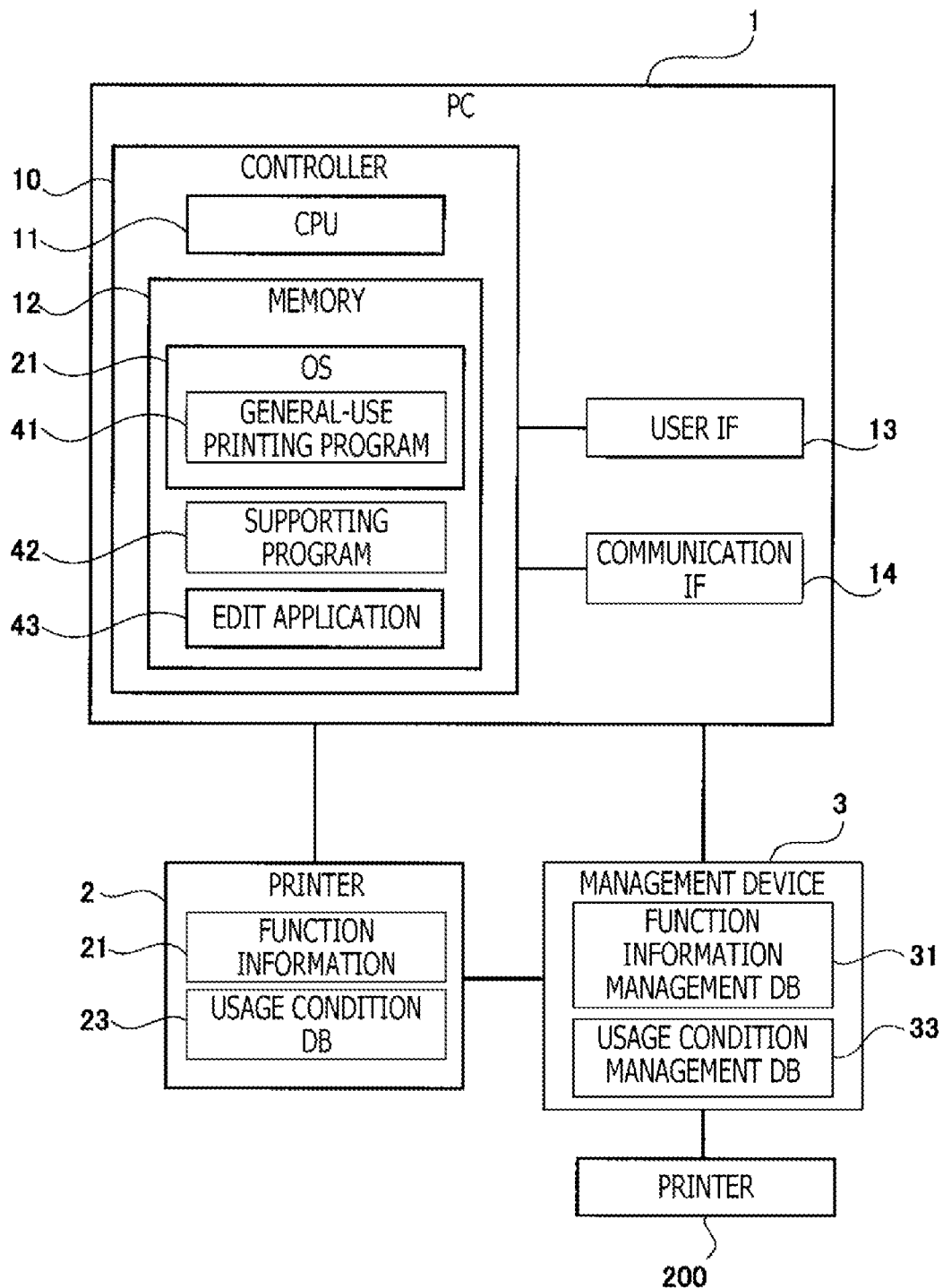
FIG. 1 is a block diagram of a printing system according to a first embodiment.

A PC 1 according to a first embodiment includes, as shown in FIG. 1, a controller 10 including a CPU 11 and a memory 12. The PC 1 has a controller 10 including a CPU 11 and a memory 12. The PC 1 is an example of an information processing device. The CPU 11 is an example of a computer. The PC 1 is also equipped with a user interface (hereinafter referred to as a "user IF") 13 and a communication interface (hereinafter referred to as a "communication IF") 14, which are electrically connected to the controller 10. It is noted that the "controller" 10 indicated in FIG. 1 is a generic term for hardware and software used to control the PC 1, and does not necessarily represent a single piece of hardware that actually existing in the PC1.

The CPU 11 executes various processes in accordance with programs read from the memory 12 and/or based on user operations. Various programs, including various application programs (hereinafter simply referred to as "applications"), and various data are stored in the memory 12. The memory 12 is also used as a work area when various processes are executed. It is noted that a buffer provided in the CPU 11 is also an example of memory. The example of the memory 12 is not limited to a ROM, a RAM, an HDD, and the like included in the PC 1, but can also be a storage medium such as a CD-ROM, a DVD-ROM, and the like that is readable and writable by the CPU 11.

The user IF 13 includes hardware for displaying a screen for informing the user of information and hardware for receiving operations by the user. The user IF 13 may be a combination of a display configured to display information and a mouse, keyboard, and the like having an input receiving function, or a touchscreen panel having both a display function and an input receiving function.

The communication IF 14 includes hardware for communicating with external devices such as the printer 2, a management device 3 and the like. A communication standard of the communication IF 14 is Ethernet (registered trademark), Wi-Fi (registered trademark), USB, and the like. The PC 1 may include multiple communication IFs 14 respectively corresponding to multiple communication standards.

The memory 12 of the PC 1 stores an operating system (hereinafter referred to as an "OS") 21 including a general-use printing program 41, a supporting program 42, and an editing application 43, as shown in FIG. 1. The supporting program 42 is an example of a supporting program. The editing application 43 is an example of an application program. The OS 21 is, for example, Windows (registered trademark), macOS (registered trademark), Linux (registered trademark), iOS (registered trademark), or Android (registered trademark).

The general-use printing program 41 is an OS-standard program for executing printing on various printers, such as the printer 2, based on the user's instructions.

The general-use printing program 41 supports functions that can be commonly used by multiple models of printers provided by various printer vendors. The general-use printing program 41, however, does not support all of the functions that are inherent to the multiple models of printers, and functions the general-use printing program 41 supports are limited to generic ones.

The supporting program 42 is a program or group of programs that accompanies the processing of the general-use printing program 41 and executes processing based on instructions from the OS 21, and is an application that supports the control of a target hardware. The supporting program 42 in the present embodiment corresponds to the model of the printer 2 connected to the PC 1. For example, the supporting program 42 is launched by the general-use printing program 41 when the instructions to execute printing on the printer 2 are received using the general-use printing program 41. The supporting program 42 is called, for example, a hardware support application (abbreviated as HSA).

The supporting program 42 is capable of receiving multiple types of instructions from the general-use printing program 41 and executes various processes based on the received instructions. The supporting program 42 may be a combination of multiple programs each receiving an execution instruction, or a single program that can execute different processes depending on execution instructions.

The supporting program may be a program prepared for each type of a printer by the vendors of the printer. For example, a supporting program for an inkjet printer and another supporting program for a laser printer may be prepared. When, for example, a new printer is connected to the PC 1, the OS 21 of the PC 1 downloads an appropriate supporting program from a server or the like according to the type of the connected printer, and incorporates the downloaded supporting program into the device. Then, the OS 21 stores the identification information of the embedded supporting program in the memory 12, with associating the identification information of the embedded supporting program with the printer information of the newly connected printer. It is noted that the supporting program may not necessarily be prepared for each printer type, but may be prepared for each of the printer models or series of printer models.

The editing application 43 is, for example, an application for generating and editing image data and document data. The editing application 43 may be, for example, Word or PowerPoint provided by Microsoft (registered trademark), or an application provided by a vendor of the printer 2. The editing application 43 is configured to receive user operations including instructions to cause the printer 2 to perform a particular operation. Concretely, the editing application 43 is configured to, for example, receive, via the user IF 13, a print execution instruction to cause the printer 2 to perform printing.

The printer 2 in the present embodiment is a device having a printing function. The PC 1 can communicate with the printer 2 via the communication IF 14. The printer 2 is configured to receive print data, for example, from the PC 1 or other devices and execute printing based on the received print data. Further, the printer 2 according to the present embodiment has a restriction function of determining whether printing can be performed based on a usage condition set for each user. The restriction function can be enabled or disabled through the management device 3 or through the operation panel of the printer 2. The memory of the printer 2 stores function information 21 that indicates the enablement or disablement of the restriction function. The function information 21 may include information on the enablement and disablement of other functions, such as the scanning function, the facsimile transmission function, and the like. The printer 2 according to the present disclosures is also provided with a usage condition DB 23 storing usage condition set to respective users.

FIG. 2 shows an example of a data structure of the usage condition DB 23. The usage condition DB 23 stores the usage condition each associated with a user name, which indicates a name of the user, and a user ID, which identifies the user. The user ID is an example of identification information.

The usage condition is a condition that determine whether printing can be executed on the printer 2. The usage condition in the present embodiment restricts the use of specific print settings. The specific print settings are, for example, print settings that contribute to saving consumables such as toner, paper or the like.

The usage condition includes, for example, a condition on the number of prints, a condition on color/monochrome, and a condition on toner saving. The condition on the number of prints defines an upper limit of the number of sheets that a user can print in one print job. The "number of prints" condition may be set to "unlimited" to indicate that the number of prints is not limited. The number of prints may be the number of times of printing which is counted for each print job. The number of prints may be the total number of sheets of paper that can be printed within a given period of time, or the total number of times the print job can be executed. The condition on "color/monochrome" indicates whether color printing is restricted or not. In other words, when the use of color printing is restricted and only the use of monochrome printing is permitted, only "monochrome" is set in the "color/monochrome" setting. The condition on toner saving indicates whether or not printing is restricted that toner saving has not been set. In other words, when printing that the toner saving is not set is restricted and printing that the toner saving is set is allowed, "on" is set as the "toner saving" condition, and when printing that toner saving is not set is allowed, "on" and "off" are set as the "toner saving" condition.

Further, the usage condition may include a condition on single-sided/double-sided, a condition on aggregate printing (e.g., 2-in-1), and a condition on printing of specific paper types. The "single-sided/double-sided" condition indicates whether or not single-sided printing is restricted. The "aggregate printing" condition indicates whether printing without aggregation set is restricted or not. The "print on specific paper type" condition indicates whether printing on a sheet of a specific paper type, such as postcards, is restricted or not.

In the present embodiment, a target user of the identification information is regarded as an individual, but a group or a company (corporation) may be regarded as the target user of the identification information. In the latter case, the usage condition is associated with group identification information that identifies a group as the user and company identification information that identifies a company (corporation) as the user and are stored in the usage condition DB 23.

Returning to FIG. 1, the management device 3 is a device having a communication function and a data storage function. The management device 3 is communicatively connected, for example, to a plurality of printers, including the printer 2 that has a restriction function and a printer 200 that does not have the restriction function. The management device 3 is configured to collectively manages the connected printers.

The management device 3 has, for example, a function information management DB 31 and a usage condition management DB33. The management device 3 is, for example, a PC used by an administrator or a server set on a network. The function information management DB 31 is a database for managing function information for each printer connected to the management device 3. The function information management DB 31 stores function information including, for example, information indicating the enablement and disablement of the restriction functions in association with the identification information of the printer.

The usage condition management DB 33 is a database for managing the usage condition set by the user for each printer connected to the management device 3. The usage condition management DB 33 stores the usage condition DB in association with the identification information of the printer. The management device 3 periodically communicates with the printers connected to the management device 3, and synchronizes the data regarding function information and usage condition so that the data represent the latest updates. Therefore, the function information 21 and the usage condition DB 23 of printer 2 are synchronized with the function information management data of printer 2 by management device 3. Therefore, the function information 21 and usage condition DB 23 that printer 2 has are the same as function information and usage information DB, with respect to the printer 2, that are stored in the function information management DB 31 and usage condition management DB 33.

Figure 3:
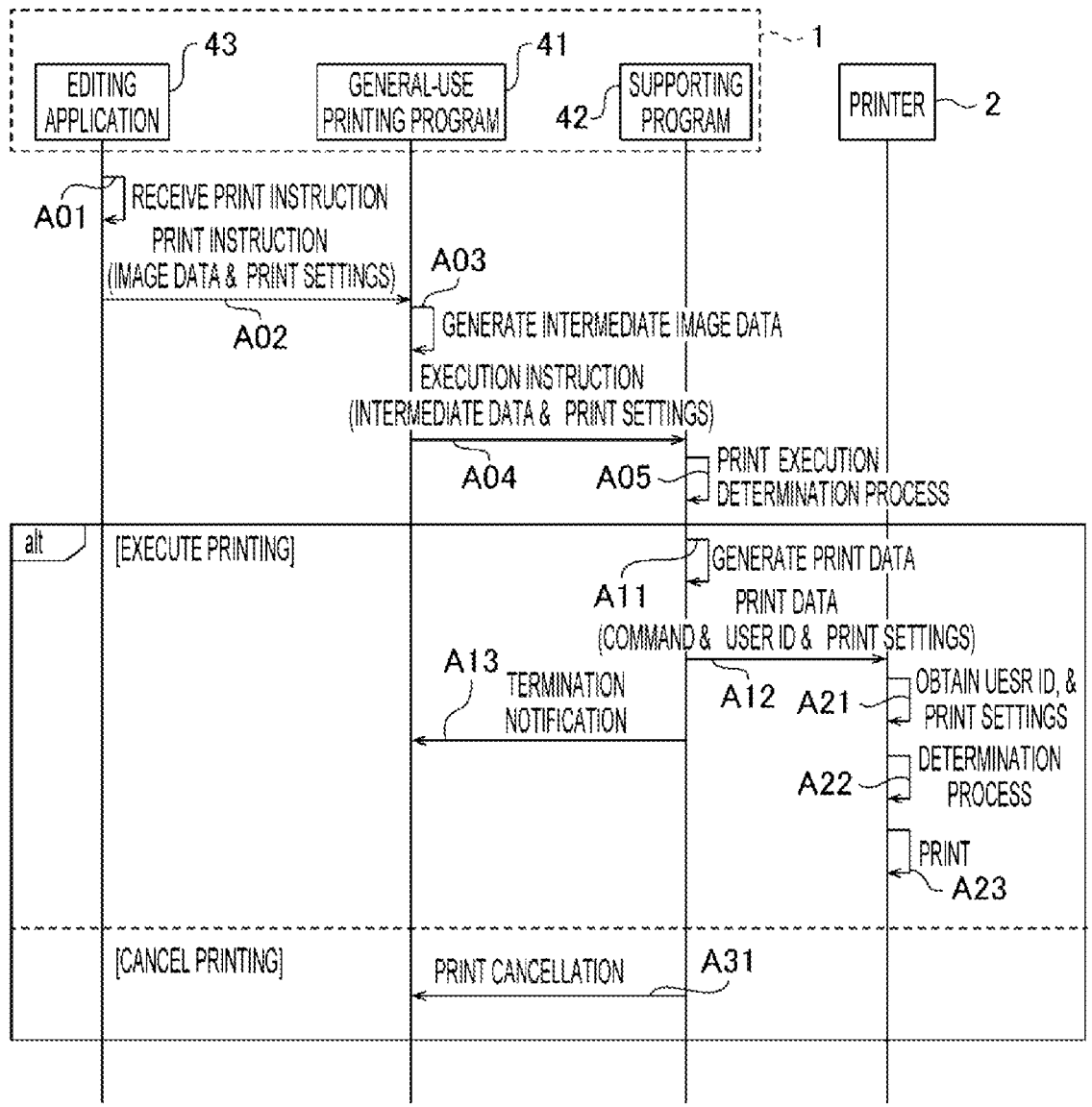
FIG. 3 shows procedure of printing operations executed by each programs.

Next, a procedure of printing including an operation of the supporting program 42 according to the present embodiment will be described with reference to a sequence diagram shown in FIG. 3. FIG. 3 shows an operation when a print execution instruction to print with the printer 2 using the general-use printing program 41 is received by an application that receives the print instructions such as an editing application 43, and when the supporting program 42 corresponding to the printer 2 has been incorporated in the PC 1.

Each processing step in processes and flowcharts in the present embodiment basically indicates processing performed by the CPU 11 in accordance with instructions described in a program such as the supporting program 42, and the like. The processing by the CPU 11 also includes hardware control using an API of the OS 21. In this specification, a detailed description of OS 21 is omitted and the operation of each program is described. In addition, the term "obtain" is used in a concept that does not require a request.

As shown in FIG. 3, when the editing application 43 receives a print instruction (A01) with the printer 2 and various print settings being selected on the print screen after receiving the editing of text, graphics, and the like, the editing application 43 passes the information about the received print instruction to the OS 21. When the print instruction is received, the OS 21 executes the general-use printing program 41 and passes the image data, print settings, and other information about the print instruction to the general-use printing program 41 (A02).

The general-use printing program 41 generates intermediate image data by converting the format of the image data contained in the information about the received print instructions into the format of intermediate image data, and generates a print job including the intermediate image data (A03). The image data passed from the editing application 43 can be of various types, and the general-use printing program 41 converts the received image data into the intermediate image data suitable for generating the print data. It is noted that when the image data included in the print instruction is suitable for generating the print data, the generating of the intermediate image data may be omitted and the image data included in the print data may be used as the intermediate image data as is. The intermediate image data generated by the general-use printing program 41 is, for example, XPS data.

The general-use printing program 41 is configured to output an execution instruction to the supporting program 42 as the device selected in the print instruction is the printer 2 and the supporting program 42 corresponding to the printer 2 is stored in the memory 12 (A04). The general-use printing program 41 causes the supporting program 42 to operate by the execution instruction and passes the generated intermediate image data to the supporting program 42. It is noted that, in A04, the information on the print settings is also passed to the supporting program 42 along with the intermediate image data.

The general-use printing program 41 may cause the supporting program 42 to be executed before generating the intermediate image data. The supporting program 42 may, for example, receive information indicating the print settings included in the print instructions from the general-use printing program 41, edit some of the information, and return the same to the general-use printing program 41.

When the supporting program 42 receives an execution instruction from the general-use printing program 41 in A04, the supporting program 42 executes a print execution determination process (A05). The print execution determination process is for determining whether to execute or cancel the printing for which the execution instruction is received from the general-use printing program.

The procedure of the print execution determination process executed in A05 will be described with reference to the flowchart shown in FIGS. 4A and 4B. This print execution determination process is a process realized by the supporting program 42 and is executed by the CPU 11 of the PC 1. In the print execution determination process, the CPU 11 first obtains the function information 21 that contains the information on the enablement/disablement of the restriction function (S1). It is noted that a process in S1 is an example of the management information obtaining process.

For example, the CPU 11 requests, via the communication IF 14, the transmission of the function information 21 to the printer 2 selected in the print instruction. When the CPU 11 receives the function information 21 output by the printer 2 in response to the request via the communication IF 14, the CPU 11 stores the function information in the memory 12.

It is noted that the CPU 11 may obtain the function information 21 from the management device 3. For example, the CPU 11 may transmit the identification information of the printer 2 to the management device 3 via the communication IF 14. When the management device 3 receives the identification information of the printer 2 from the PC 1, the management device 3 extracts the function information associated with the printer 2 from the function information management DB 31 and transmits the extracted function information 21 to the PC 1. The CPU 11 receives the function information 21 transmitted from the management device 3 via the communication IF14 and stores the same in the memory 12.

The CPU 11 determines whether the function information 21 was successfully obtained in S1 (S3). A printer that does not have any restriction functions, such as printer 200, does not have the function information 21. If such a printer 200 is selected, the CPU 11 fails to obtain the function information 21 (S3: NO). In such a case, since no usage restriction is made and it is assumed that anyone can use any function, the CPU 11 determines that printing is to be executed (S25) and returns to the process of FIG. 3.

Figure 4A:
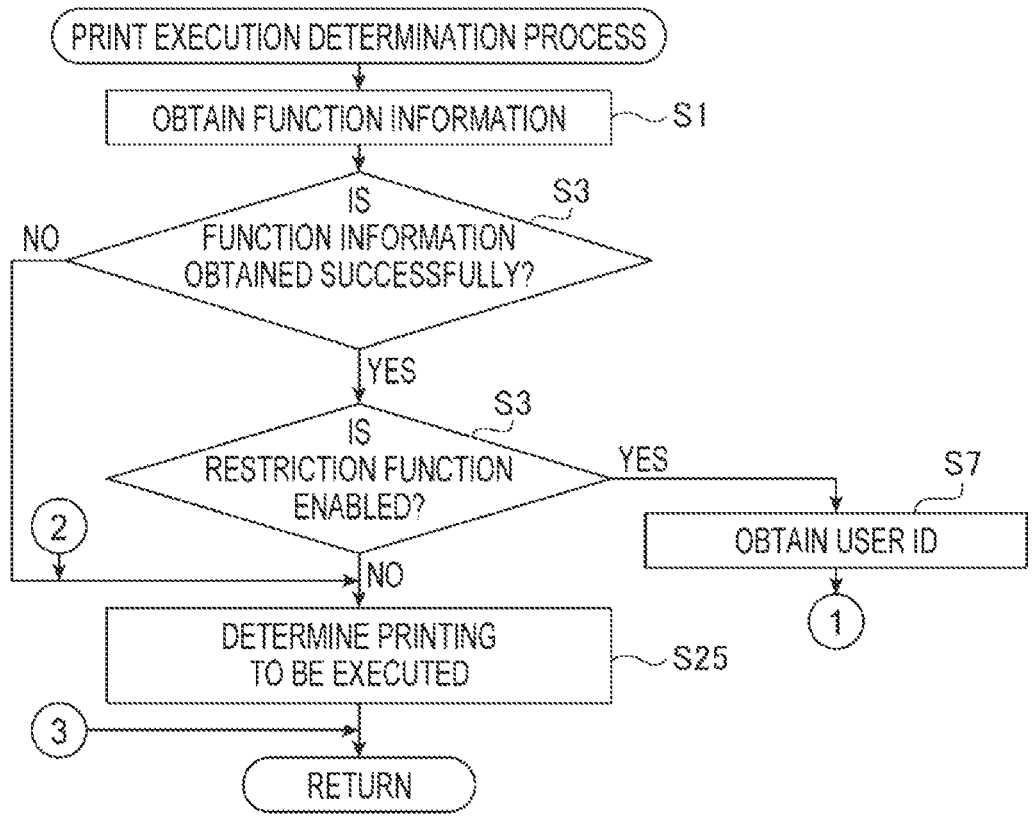
FIG. 4A and FIG. 4B are a flowchart illustrating an example of procedure of a print execution determination process.
Figure 4B:
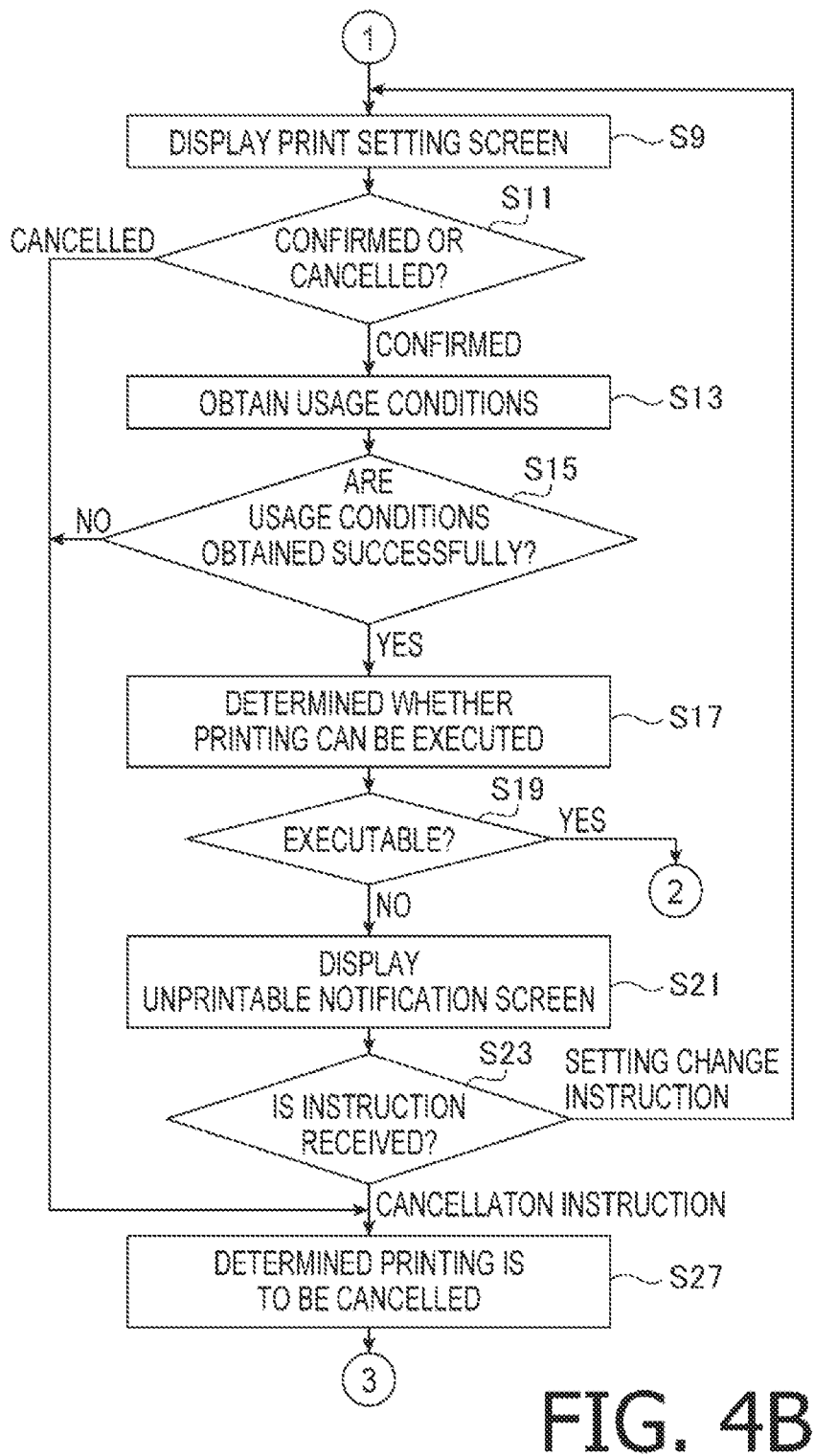

On the other hand, as shown in FIGS. 4A and 4B, when the CPU 11 obtains the function information 21 successfully (S3: YES), the CPU 11 determines whether the information indicating the enablement/disablement of the restriction function, which is contained in the function information 21 obtained in S1, is enabled (S5). For example, when the obtained function information 21 includes information indicating the disablement of the restriction function (S5: NO), the CPU 11 determines that printing is to be executed (S25), since no usage restrictions are made and printing can be performed unconditionally. Thereafter, the CPU 11 return to the process of FIG. 3.

As shown in FIGS. 4A and 4B, when the obtained function information 21 includes information indicating that the restriction function is enabled (S5: YES), the CPU 11 obtains the user ID (S7). The process in S7 is an example of the identification information acquisition process. For example, the CPU 11 displays, via the user IF 13, an identification information input screen for inputting a user ID, and receives an input operation of the user ID. In other words, the CPU 11 obtains the user ID by manual input by the user. It is noted that the CPU 11 may automatically obtain the account of the login user registered in the OS 21 as the user ID from the OS 21.

The CPU 11 may cancel printing when the user ID cannot be obtained. Further, when the CPU 11 cannot obtain the user ID automatically from the OS 21, the CPU 11 may display the identification information input screen on the user IF 13 and switch the user ID input method from automatic input to manual input. In addition, when the user ID is automatically obtained from the OS 21, the CPU 11 may have the user confirm the automatically obtained user ID. In this case, it may be possible to change the user ID at the timing when the user ID is confirmed.

Figure 5:
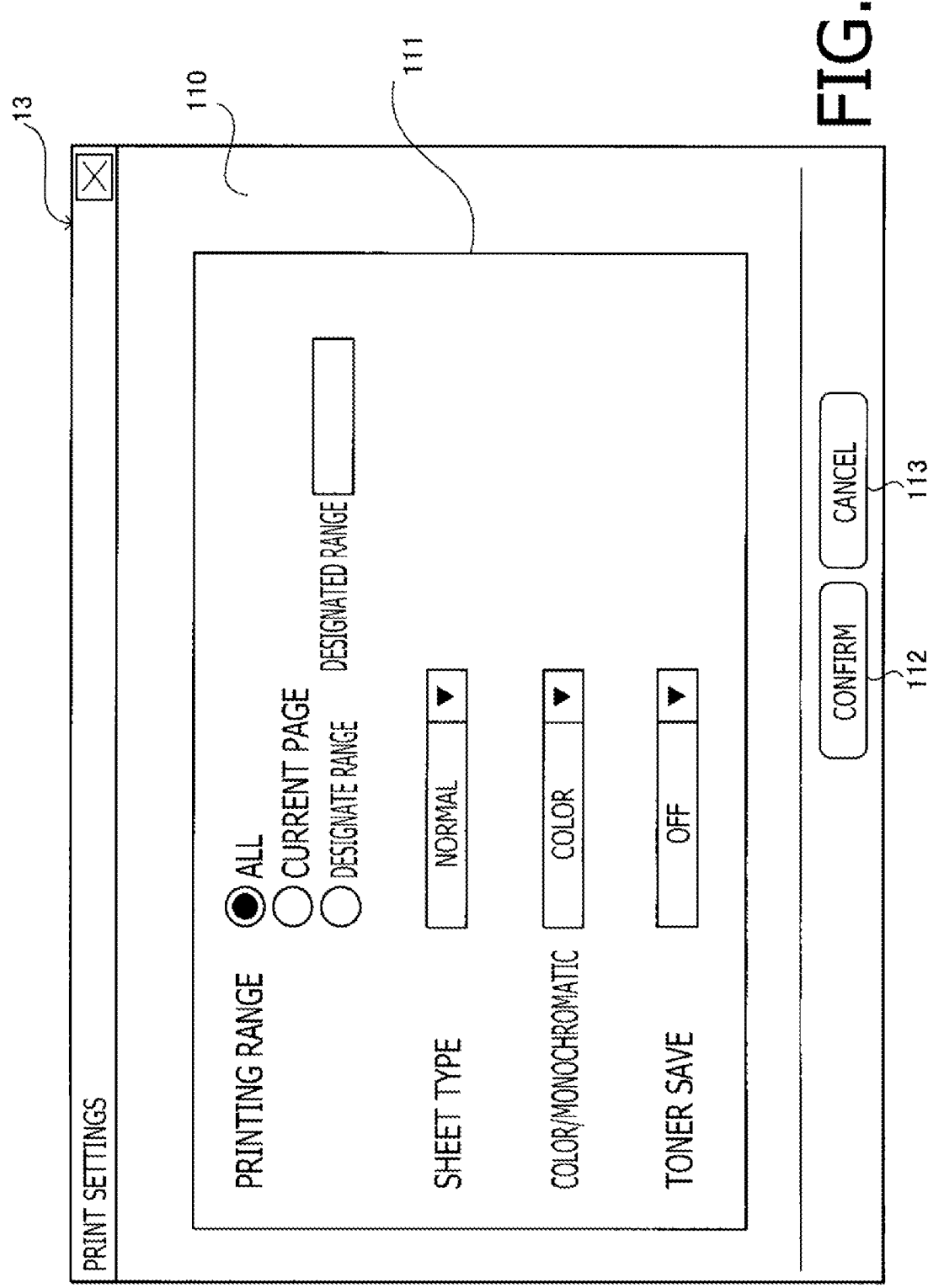
FIG. 5 is an example of a print setting screen.

After obtaining the user ID, the CPU 11 displays the print setting screen 110 as shown in FIG. 5 via the user IF (S9). The print setting screen 110 is a screen for receiving input operations of print settings, and includes, for example, a setting area 111, a confirmation button 112, and a cancel button 113. In the setting area 111, there is a setting field for setting values for each print setting item. In respective items, the print settings received from the general-use printing program 41 with the execution instruction in A04 of FIG. 3 are displayed. The CPU 11 receives operations to manually change the setting values of respective items displayed on the print settings screen 110 via the user IF 13. The items displayed on the print setting screen 110 include items corresponding to the usage condition and may include items that cannot be supported by the general-use printing program 41. By displaying the print setting screen 110 before the judgment (S17) described later, print settings specific to the printer 2 that cannot be supported by the general-use printing program 41, can be received, and furthermore, functional restrictions can be set for such specific print settings.

As shown in FIGS. 4A and 4B, the CPU 11 determines whether to confirm or cancel the print settings (S11). When the cancel button 113 of 110 is operated via the user IF 13 (S11: Cancelled), the CPU 11 determines that the printing is canceled (S27) and returns to the process of FIG. 3.

On the other hand, when the confirmation button 112 of the print setting screen 11 shown in FIG. 5 is operated via the user IF 13, the CPU 11 determines that the print setting is to be confirmed (S11: confirm) and obtains the usage condition (S13). It is noted that the process of S13 is an example of the usage condition obtaining process. For example, the CPU 11 requests the printer 2 selected in the confirmed print settings to transmit the usage condition. To the request, the user ID obtained in S7 is attached. The printer 2 that receives the request extracts the usage condition associated with the user ID received together with the request from the usage condition DB 23 and transmits the same to the PC 1. The CPU 1 receives the usage condition from the printer 2 via the communication IF 14 and stores the same in the memory 12.

The CPU 11 may obtain the usage condition from the management device 3. For example, the CPU 11 extracts the identification information of the printer 2 from the confirmed print settings, and transmits the extracted identification information of the printer 2 and the user ID obtained in S7 to the management device 3 via the communication IF 14. When the management device 3 receives the identification information of the printer 2, the management device 3 identified the usage condition DB 23 associated with the identification information of the printer 2 with referring to the usage management DB 33. Then, the management device 3 checks the received user ID against the identified usage condition DB 23 and extracts the usage condition associated with the user ID. Then, the management device 3 transmits the extracted usage condition to the PC 1. The CPU 11 receives the usage condition transmitted from the management device 3 via the communication IF 14 and stores the same in the memory 12.

The CPU 11 determines whether the usage condition have been successfully obtained (S15). When the CPU 11 fails to obtain the usage condition (S15: NO), since whether printing is possible or not cannot be determined using the usage condition, the CPU 11 determines that printing is cancelled (S27) and returns to the process of FIG. 3.

As shown in FIGS. 4A and 4B, when the CPU 11 obtains the usage condition successfully (S15: YES), the CPU 11 determines whether printing can be performed on the printer 2 (S17). It is noted that a process in S17 is an example of the determination process. In S17, the CPU 11 checks the usage condition obtained in S13 against the print settings confirmed in S11, and determines whether printing on the printer 2 can be performed according to the confirmed print settings.

The CPU 11 determines whether printing on the printer 2 is determined to be executable or not (S19). When the confirmed print settings satisfy all the usage conditions and when the printing on printer 2 is determined to be executable (S19: YES), the CPU 11 determines that printing is to be executed (S25) and returns to the process of FIG. 3. For example, when the print settings received from the general-use printing program 41 along with the execution instructions (i.e., the print setting which has not receive the change through the print setting screen 110 that is displayed in S9) satisfy all the usage condition, the CPU 11 determines that the printing is to be executed. Alternatively, when the print settings for which the execution instructions is received together from the general-use printing program 41 are first edited via the print setting screen 110 before the determination process of S17 is performed, the CPU 11 determines that printing is to be executed.

On the other hand, as shown in FIGS. 4A and 4B, when the CPU 11 determines that the confirmed print settings do not satisfy any of the usage conditions and printing on printer cannot be executed (S19: NO), the CPU 11 displays an unprintable notification screen on the user IF 13 (S21). It is noted that a process in S21 is an example of the notification process.

Figure 6:
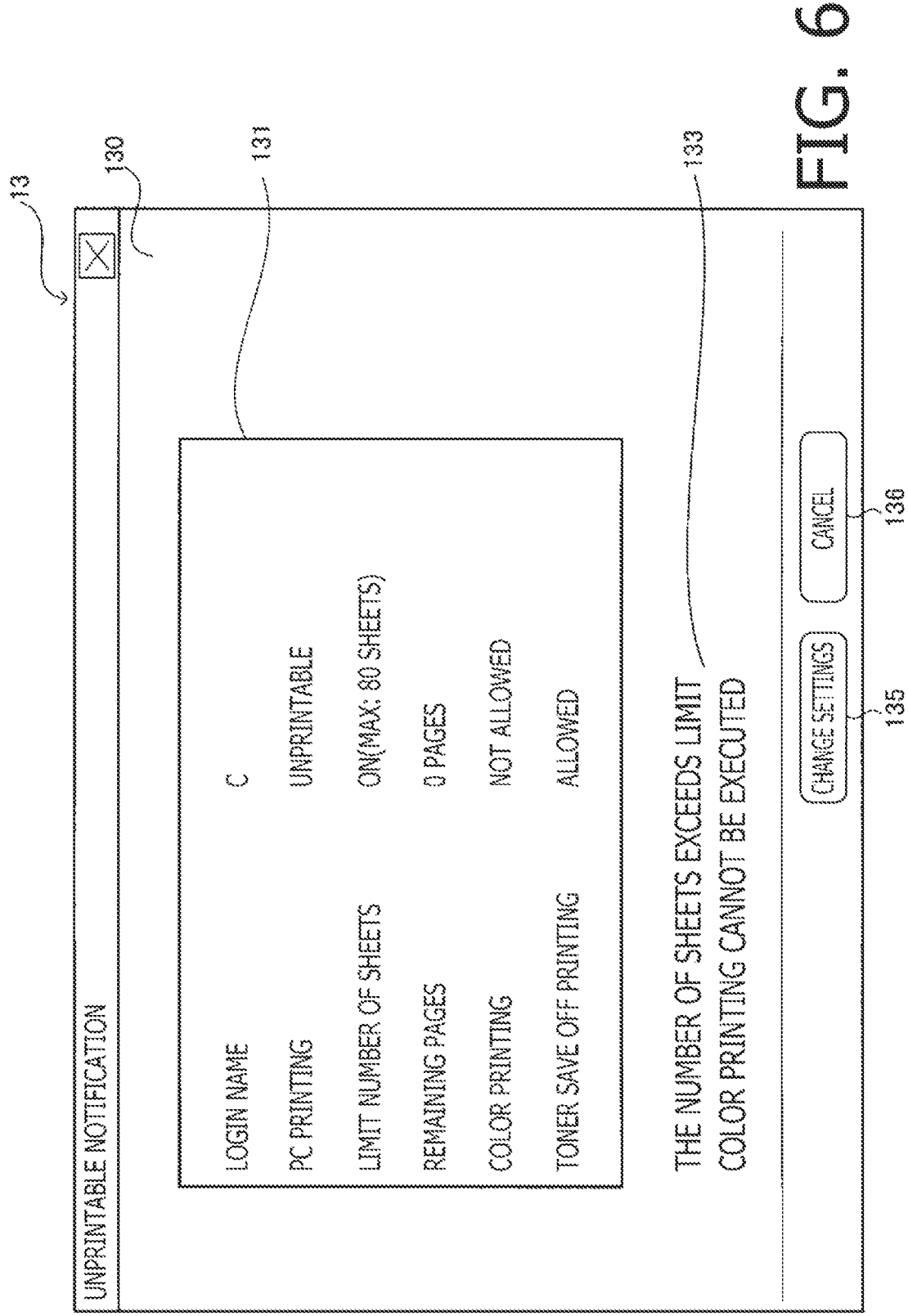
FIG. 6 is an example of a print notification screen.

As shown in FIG. 6, a print notification screen displayed on the user IF 130 includes, for example, a first display field 131 that displays information based on the usage condition, and a second display field 133 that displays information about items that do not satisfy the usage condition. Further, the unprintable notification screen 130 includes a setting change button 135 and a cancel button 136. Since the print notification screen 130 does not include a print execution button, printing can be avoided from being executed while the usage condition is not satisfied.

It is assumed, for example, that, as shown in FIG. 5, the user C intends to use the printer 2 to print a 100-page original document, and in a state where "all" is set to an item of the print range, "color" is set to an item of color/monochrome, and "ON" is set to the item of the toner save, the confirm button 112 is operated by the user. As shown in FIG. 2, the usage condition of the user C is limited such that "monochrome" is set for the item of color/monochrome, and usage of color printing is restricted. In addition, the number of printable pages for the user C is limited to 80 pages, and therefore, the user C cannot perform printing 100 pages of sheets. Furthermore, for the user C, the item of the toner save included in the usage condition is set to "ON" and "OFF" and thus the user can use printing for which the toner save is not set. Therefore, since the print settings the user C has set do not satisfy the usage condition for the user C in terms of the number of pages of the sheets to be printed and the color/monochrome setting, the printing using the confirmed print settings cannot be executed on the printer 2.

Based on the determination result, the CPU 11 generates the unprintable notification screen 130 and displays the same on the user IF 13. In other words, the CPU 11 displays the user name "C" corresponding to the user ID obtained in S7 in the login name field of the first display field 131 to notify that the information about user C is displayed. Then, the CPU 11 displays in a "PC print" field of the first display field 131, and notifies that printing is not possible on the printer 2 with the current settings.

Further, the CPU 11 displays the information based on the usage condition obtained in S13 in the first display field 131 to notify how the user C is restricted from using the printer 2. For example, the CPU 11 displays "ON" and "Max: 80 sheets" in the field of the limit number of sheets to notify the user that the number of sheets to be printed is limited and that a maximum of 80 pages can be printed. In addition, the CPU 11 displays "0 pages" in the remaining printable pages field to notify that the number of pages to be printed has exceeded the limit and no more pages can be printed. It is noted, for example, that, when the number of sheets to be printed is limited to 80, and printing of 50 pages are to be performed, since 30 more pages can be printed, the CPU 11 displays "30 pages" in the remaining printable pages field.

The CPU 11 may, for example, display "not allowed" in the color printing field to notify that color printing is not available. Further, for example, the CPU 11 may display "allowed" in the toner save OFF print field of the first display field 131 to notify that printing without toner save setting is available.

In addition, the CPU 11 may display, in the second display field 133, the number of sheets printed and color/monochrome setting that do not meet the usage conditions. For example, in the second display field 133, messages such as "The number of sheets exceed the setting." or "Color printing cannot not be performed." that notify that the usage conditions are not satisfied.

Therefore, the user C can visually recognize the items that need to be changed from the contents displayed in the second display field 133. In addition, the user C can visually recognize what settings satisfy the usage condition and enable printing on the printer 2 from the contents of the first display field 131.

For example, when the user C does not intend to print in monochrome, the user C operates the cancel button 136 of the unprintable notification screen 130 shown in FIG. 6 via the user IF 13. In this case, the CPU 11 receives the cancellation instruction (S23: cancellation instruction), determines that the printing is canceled (S27), and returns to the process of FIG. 3. Thus, printing against the intention of the user C is avoided.

Figure 7:
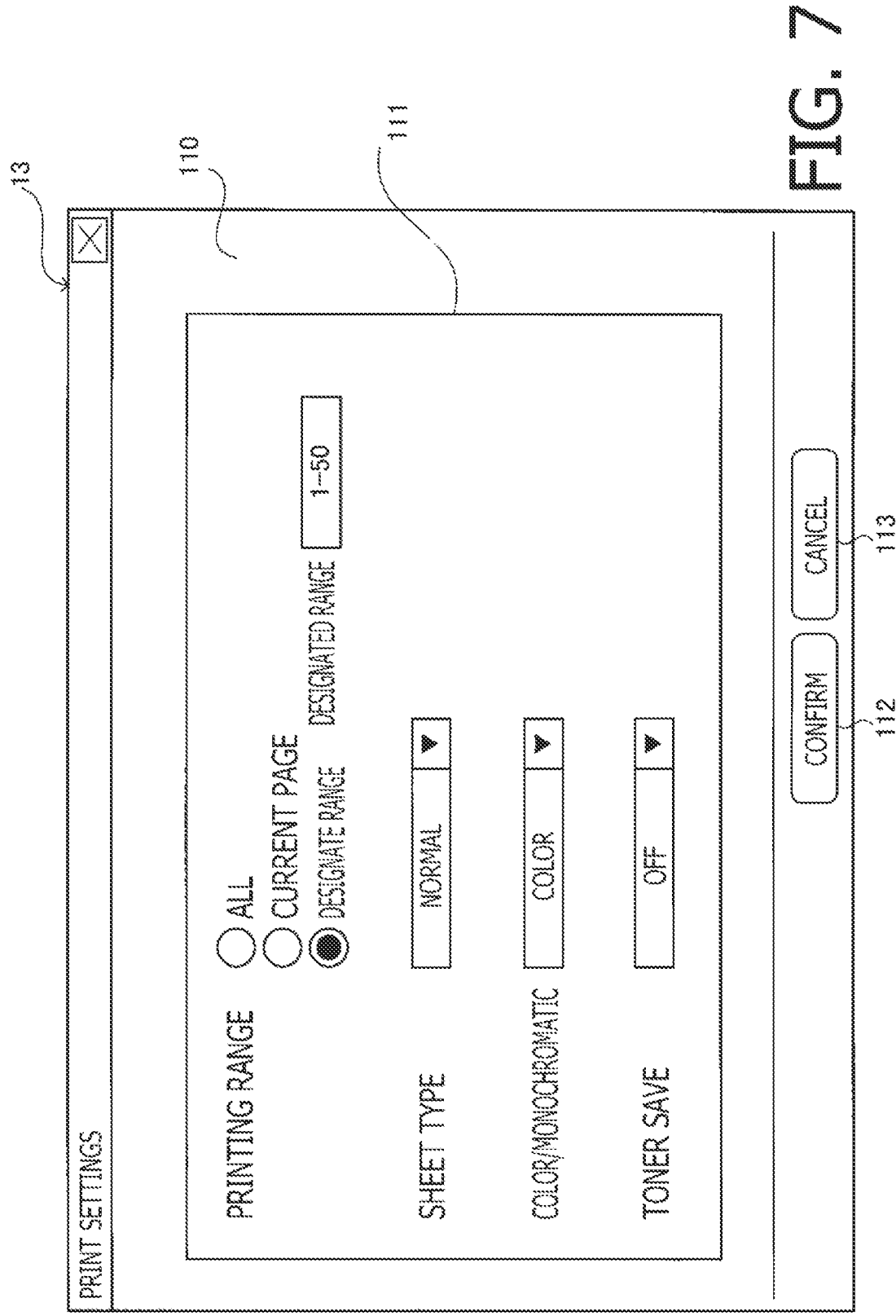
FIG. 7 is an example of a print setting screen.

On the other hand, for example, when the user C intends to change the current print settings, the user C operates the setting change button 135 of the unprintable notification screen 130 shown in FIG. 6 via the user IF 13. When the CPU 11 receives the setting change instruction (S23: setting change instruction) as shown in FIGS. 4A and 4B, the CPU 11 returns to S9, and displays the print setting screen 110 again. It is noted that the processes in S23 and S9 are examples of a changing process. The re-displayed print settings screen 110 shows the most recently confirmed print settings, as shown in FIG. 5. For example, the user C may follow indications in the first display filed 131 and the second display filed 133 of the unprintable notification screen 130, and change the print range setting from "all" to "designation range" and change the designation range to "1-50" via the user IF 13 as shown in FIG. 7. Further, the user C may also change the color/monochrome setting from "color" to "monochrome" via the user IF 13. Then, the user C operates the confirmation button 112 via the user IF 13.

Then, as shown in FIGS. 4A and 4B, the CPU 11 receives the confirmation instruction (S11: YES), and checks the changed print settings against the usage condition to determine whether printing on the printer 2 is executable or not (S17). It should be noted that the process of S13 after the print settings have been changed may be omitted since the user is the same.

When the changed print settings satisfy all the usage conditions and it is determined in S17 that printing is executable (S19: YES), the CPU 11 determines that printing is to be executed (S25) since the changed print settings satisfy all the usage conditions and returns to FIG. 3.

On the other hand, when the changed print settings do not satisfy the usage condition and are determined to be unexecutable in S17 (S19: NO), the CPU 11 redisplays the unprintable notification screen reflecting the determination (S21). When the CPU 11 receives an instruction to change the settings (S23: setting change instruction) as the user operates the setting change button on the unprintable notification screen, the CPU 11 redisplays the unprintable notification screen reflecting the determination (S9), and receive the change of the print settings again. In this way, the supporting program 42 can increase the possibility of using the printer 2 by accepting changes to the print settings until the print settings satisfy the usage condition.

As shown in FIG. 3, when the supporting program 42 determines that printing is to be executed in the print execution determination process of A05 (alt: print execution), the supporting program 42 generates print data (A11). Concretely, the supporting program 42 performs rasterization based on the intermediate image data based on the execution instructions received from the general-use printing program 41 in A04 to generate the print data representing an image subjected to be printed. The print data is generated by rasterizing the intermediate image data using the print settings, which are received from the general-use printing program 41 in A04 or the print settings changed via the print setting screen 110 displayed on the user IF 13 in S23 and S9 of FIGS. 4A and 4B, and satisfy the usage condition set for the user. The print data generated here is data in a format that can be used for printing by the printer 2. The print data is, for example, PDL data dedicated to the model of the printer 2.

Instead of the supporting program 42 generating the print data in A11, the general-use printing program 41 may generate the print data. In other words, the general-use printing program 41 may rasterize the intermediate image data generated in A03 to generate the print data. The supporting program 42 may receive the print data generated by the general-use printing program 41 and edit the print data based on the changed print settings.

The print data generated by the general-use printing program 41 is print data in a format that can be used for printing on various printers. The print data is, for example, PWGRaster data or PDF data. When the rasterization is performed by the general-use printing program 41, the processing by the supporting program 42 is reduced and increase of the processing is expected to be avoided, and a program size of the supporting program 42 can be reduced. It is noted that the general-use printing program 41 does not need to generate intermediate image data when the print data can be generated from the image data included in the print instruction without using the intermediate image data.

When the supporting program 42 generates the print data at A11, the supporting program 42 transmits, to the printer 2, the generated print data, a command to instruct printing, the user ID, and the print settings used to generate the print data (A12). In this case, the supporting program 42 passes a termination notification indicating that the print job has been transmitted to the general-use printing program 41 (A13).

The printer 2 that has received the print data obtains the user ID and the print settings which have been received with the print data (A21), and performs the determination process (A22). That is, the printer 2 extracts the usage condition corresponding to the obtained user ID from the usage condition DB 23, and checks the obtained print settings against the extracted usage condition to determine whether or not printing can be performed with the obtained print settings.

The printer 2 executes printing (A23) when the received print settings satisfy all the extracted usage conditions and printing can be performed in the determination process of A22. In this way, the printer 2 can perform, by itself, printing according to the usage condition even when print data from another PC which does not have print execution determination process as shown, for example, A05 of FIG. 3 or FIGS. 4A and 4B.

The transmitting of the print data to the printer 2 may be performed by the general-use printing program 41. In other words, the supporting program 42 may pass the generated print data to the general-use printing program 41 so that the print data is transmitted from the PC 1 to the printer 2 set as the destination. In this case, the general-use printing program 41 transmits the print data received from the supporting program 42 to the printer 2. In the present embodiment, both transmitting the print data to the printer 2 by the supporting program 42 and passing the print data to the general-use printing program 41 by the supporting program 42 for transmitting the print data to the printer 2 are examples of "processing for transmitting a print job regarding the print instruction to the printer."

When it is determined that printing is to be canceled (alt: cancel printing) in the print execution determination process in A05, that is, when the CPU 11 determines that printing is to be canceled (S27) as printing is canceled via the print setting screen as shown in FIGS. 4A and 4B (S11: NO), obtaining the usage condition is failed (S12: NO), or printing is canceled via the unprintable notification screen (S23: cancel instruction), the supporting program 42 passes the information indicating that the print job is cancelled to the general-use printing program 41 (A31). By canceling the print job when the obtaining of the usage condition is failed, unnecessary processes on the printer 2 (e.g., further restriction, by the printer 2, of printing with respect to the print job that execution has been restricted by the supporting program 42) can be avoided. It is noted that processes performed in S15, S27 and A31 are examples of the cancellation process.

The supporting program 42 outputs a print job only when it is determined that the printing is to be performed in the print execution determination process in A05, that is, only when it is determined that the printing is executable by the printer 2 in S17 of FIGS. 4A and 4B. In other words, availability of the functions of the printer 2 has been determined by the supporting program 42 through the process in A05 in FIG. 3 or S17 in FIGS. 4A and 4B. Therefore, the processes of A21 to A22 in FIG. 3 may be omitted. In such a case, the supporting program 42 may attach an omission command that omits the execution of the restriction function to the print data which is transmitted to the printer 2. The printer 2 that receives the omission command immediately executes the printing shown in A23.

As described in detail above, the supporting program 42 according to the present embodiment is configured such that when there is a print instruction to the general-use printing program 41, the supporting program 42 obtains the user ID and the usage condition corresponding to the user ID, then determines whether or not printing can be performed on the printer 2 based on both the user ID and the usage condition corresponding to the user ID, and notifies the user of the determination result via the user IF 13. Thus, before printing is performed on printer 2, the user to recognize on the PC 1 whether the printing on printer 2 can be performed.

It is noted that the embodiments disclosed herein are merely examples and do not necessarily limit the invention in any way. Therefore, the technology disclosed herein can naturally be improved and/or transformed in various ways within aspects of the present disclosures. For example, the device connected to the PC 1 is not necessarily limited to a printer, but can be a multifunctional peripheral, a copier, a facsimile machine, or any other device having a printing function. Further, the number of printers connected to the PC 1 is not necessarily limited to the number shown in the embodiments but can be two or more.

In S17 of FIGS. 4A and 4B, when printing on the printer 2 is determined to be executable (alt: executable), the CPU 11 may notify the user that there are no setting items that do not satisfy the usage condition set by the user, and that printing will be executed based on the print settings. The notification may be made via the user IF 13 or by voice or other means.

For example, the processes of S1 to S5 in FIGS. 4A and 4B may be omitted, and the supporting program 42 may perform S7 onward whenever the execution instruction is received from the general-use printing program. However, in the case where the function information 21 including the information indicating the enablement of the restriction function is not obtained, there is no need to check the print settings against the usage condition to determine whether printing is executable on the printer 2, and thus the supporting program 42 can reduce the processing load of the PC 1 by omitting the processes in S7 onward.

A setting change button 135 may be provided on the unprintable notification screen 130 shown in FIG. 6, and the print setting screen 110 may be redisplayed on the user IF 13 to accept changes in print settings when printing is determined to be unexecutable (S23: setting change instruction; S9 in FIGS. 4A and 4B). Thus, it is expected that the print settings will be changed to satisfy the usage condition, and the possibility that the printer 2 is used will be increased. In addition, by making the determination again based on the changed print settings and by receiving the changes to the print settings until it is determined that printing on the printer 2 is executable (S17 in FIGS. 4A and 4B), the possibility of using printer 2 is further increased.

The supporting program 42 may execute a storing process to obtain the usage conditions of multiple users (users A to D in FIG. 2) set for the printer 2 and store the same in the memory 12. The timing for executing the storing process may be any time before the process of S17 shown in FIGS. 4A and 4B. The timing of executing the storing process may be any time before the supporting program 42 receives the execution instructions from the general-use printing program 41 in A04 of FIG. 3, before the user ID is obtained in S7 of FIGS. 4A and 4B, or before the print settings are confirmed in S11. After obtaining the user ID in S7, the supporting program 42 may check the obtained user ID against the usage condition stored in the memory 12, and obtain the usage condition associated with the obtained user ID. Then, the process of S17 is performed based on the obtained usage condition. In this way, the supporting program 42 obtains the usage condition of multiple users in advance, and when a print instruction is received, the supporting program 42 extracts appropriate usage condition from the usage condition which was obtained in advance. In this way, compared to the case where the usage condition is obtained after the print instruction is received, it is easier to obtain the usage condition earlier. In addition, a time period from when the PC1 receives a print instruction to the time the printer 2 completes printing can be shortened.

The process in S15 of FIGS. 4A and 4B may be omitted and printing based on the print instruction may not be canceled when the obtaining of the usage condition fails.

After receiving the execution instruction from the general-use printing program 41 and before performing the first determination process, the supporting program 42 may not display the print setting screen, but may perform the determination process based on the print settings attached to the execution instruction.

In the above-described embodiment, information same as the function information 21 and information same as the usage condition DB 23 which the printer 2 is stored in the function information management DB 31 and usage condition management DB 3 of management device 3 in association with the identification information of the printer 2. The configuration may be modified such that, only the printer 2 may have the function information 21 and the usage condition DB 23, and the printer 2 may not be connected to the management device 3, or the management device 3 may not have the function information management DB 31 or the usage condition management DB 33. In this case, the supporting program 42 always obtains the function information 21 including the information indicating the enablement/disablement of the restriction function and the usage condition set by the user from the printer 2. Accordingly, it is expected that the printer 2 obtains the latest usage condition. Alternatively, the printer 2 may not have the function information 21 including the enablement/disablement of the restriction function, or the usage condition set by the user, and management may be performed only by the management device 3. In such a case, common usage condition can be used by multiple printers. Even in a printer that does not have the restriction function, the supporting program 42 can perform the determination process in S17 of FIGS. 4A and 4B using the usage information obtained from the management device 3, and the supporting program 42 can restrict the functions that the user can use when performing printing according to the usage condition. Further, one of the printer 2 and the management device 3 may have the function information 21 and the other of the printer 2 and the management device 3 may have the usage condition.

It is noted that, in the embodiments, only the printing operation is described in detail as the operation of the supporting program 42, but the supporting program 42 may have other roles in addition. The program that executes the processing according to the present disclosures is not necessarily limited to the supporting program 42, but can be any program that is configured to receive instructions from the OS 21 or the general-use printing program 41 when printing is to be performed using the general-use printing program 41. It is further noted that the program may be a print workflow application for which Microsoft Corporation has released specifications.

The execution timing of the supporting program 42 is not necessarily limited to the example of the embodiment. For example, the supporting program 42 may accept execution instructions directly from the OS 21, or the program may be a resident supporting program 42. In the case where the program is a resident program, the supporting program 42 should perform the aforementioned operation upon receiving execution instructions.

In any flowchart disclosed in the embodiment, a plurality of processes in any plurality of steps can be executed in any order, or can be executed in parallel, to the extent that there is no inconsistency in the processing content.

The processes disclosed in the embodiments may be executed by a single CPU, multiple CPUs, hardware such as an ASIC, or a combination thereof. In addition, the processes disclosed in the embodiments may be realized in various forms, such as a non-transitory computer-readable recording medium in which a program for executing the processing is recorded as computer-executable instructions, or a method.

Second Embodiment

The procedure of the print execution determination process executed in A05 according to a second embodiment of the present disclosure will be described with reference to the flowchart shown in FIGS. 8A and 8B. This print execution determination process is a process realized by the supporting program 42 and is executed by the CPU 11 of the PC 1. In the print execution determination process, the CPU 11 first obtains the function information 21 that contains the information on the enablement/disablement of the restriction function (S101). It is noted that a process in S1 is an example of the management information obtaining process.

The CPU 11 determines whether the function information 21 was successfully obtained in S1 (S3). The printer 200, which does not have any restriction functions, does not have the function information 21. If such a printer 200 is selected, the CPU 11 fails to obtain the function information 21 (S3: NO). In such a case, since no usage restriction is made and it is assumed that anyone can use any function, the CPU 11 determines that printing is to be executed (S25) and returns to the process of FIG. 3.

Figure 8A:
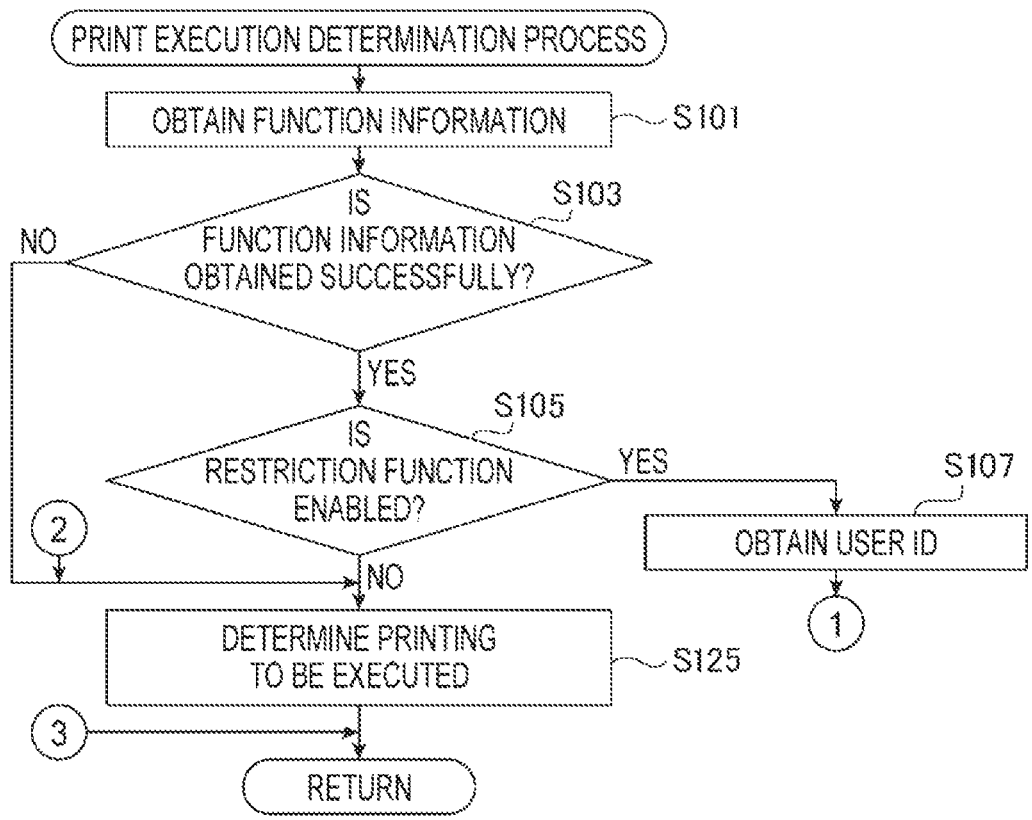
FIG. 8A and FIG. 8B are a flowchart illustrating an example of procedure of a print execution determination process.
Figure 8B:
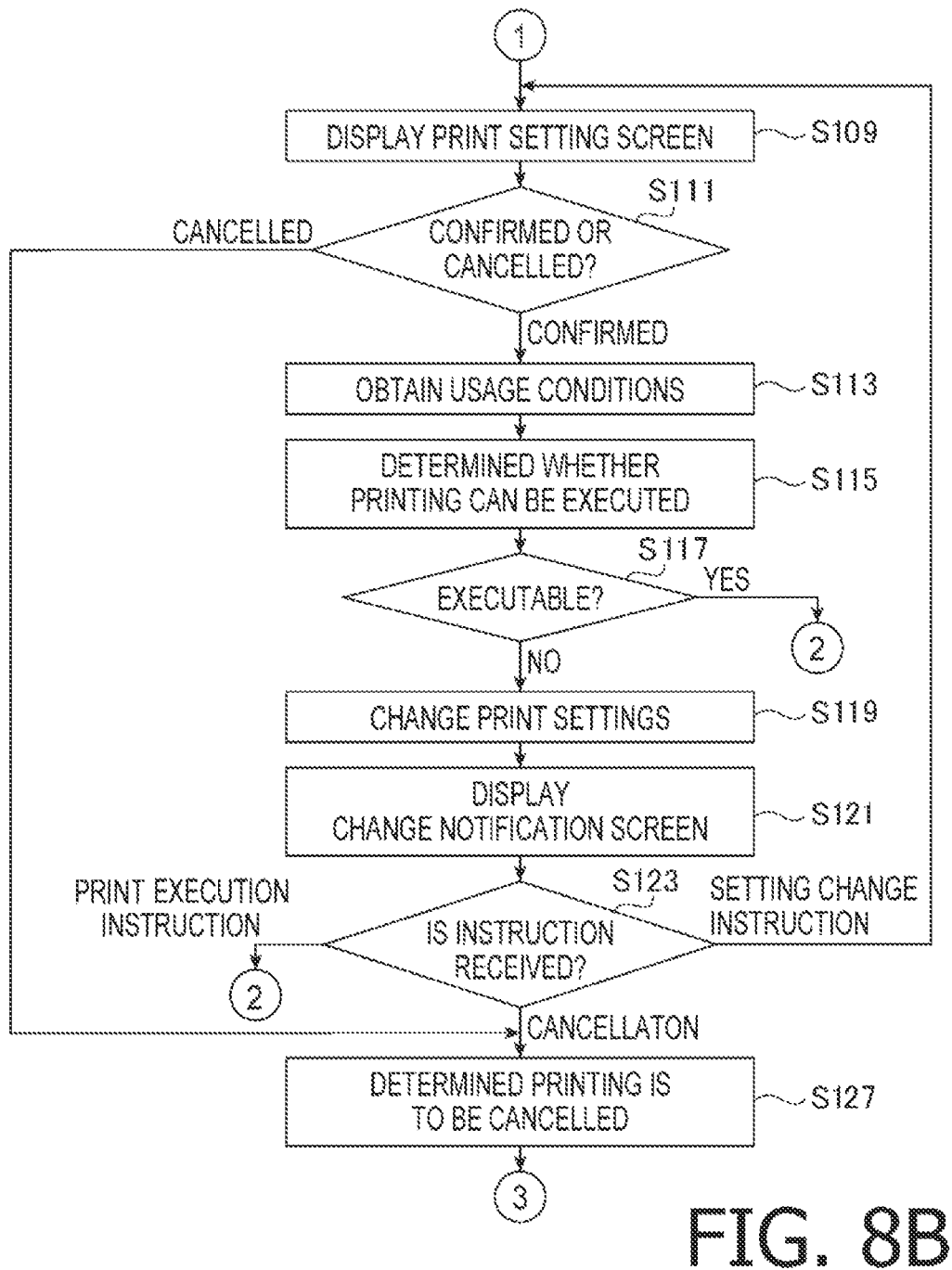

On the other hand, as shown in FIGS. 8A and 8B, when the CPU 11 obtains the function information 21 successfully (S103: YES), the CPU 11 determines whether the information indicating the enablement/disablement of the restriction function, which is contained in the function information 21 obtained in S1, is enabled (S105). For example, when the obtained function information 21 includes information indicating the disablement of the restriction function (S105: NO), the CPU 11 determines that printing is to be executed (S125), since no usage restrictions are made and printing can be performed unconditionally. Thereafter, the CPU 11 return to the process of FIG. 3.

As shown in FIGS. 8A and 8B, when the obtained function information 21 includes information indicating that the restriction function is enabled (S105: YES), the CPU 11 obtains the user ID (S107). The process in S107 is an example of the identification information acquisition process. For example, the CPU 11 displays, via the user IF 13, an identification information input screen for inputting a user ID, and receives an input operation of the user ID. In other words, the CPU 11 obtains the user ID by manual input by the user. It is noted that the CPU 11 may automatically obtain the account of the login user registered in the OS 21 as the user ID from the OS 21.

The CPU 11 may cancel printing when the user ID cannot be obtained. Further, when the CPU 11 cannot obtain the user ID automatically from the OS 21, the CPU 11 may display the identification information input screen on the user IF 13 and switch the user ID input method from automatic input to manual input. In addition, when the user ID is automatically obtained from the OS 21, the CPU 11 may have the user confirm the automatically obtained user ID. In this case, it may be possible to change the user ID at the timing when the user ID is confirmed.

After obtaining the user ID, the CPU 11 displays the print setting screen 110 as shown in FIG. 5 via the user IF (S9). The print setting screen 110 is a screen for receiving input operations of print settings, and includes, for example, a setting area 111, a confirmation button 112, and a cancel button 113. In the setting area 111, there is a setting field for setting values for each print setting item. In respective items, the print settings received from the general-use printing program 41 with the execution instruction in A04 of FIG. 3 are displayed. The CPU 11 receives operations to manually change the setting values of respective items displayed on the print settings screen 110 via the user IF 13. The items displayed on the print setting screen 110 include items corresponding to the usage condition and may include items that cannot be supported by the general-use printing program 41. By displaying the print setting screen 110 before the judgment (S115) described later, print settings specific to the printer 2 that cannot be supported by the general-use printing program 41, can be received, and furthermore, functional restrictions can be set for such specific print settings.

As shown in FIGS. 8A and 8B, the CPU 11 determines whether to confirm or cancel the print settings (S111). When the cancel button 113 of 110 is operated via the user IF 13 (S111: Cancelled), the CPU 11 determines that the printing is canceled (S127) and returns to the process of FIG. 3.

Figure 9:
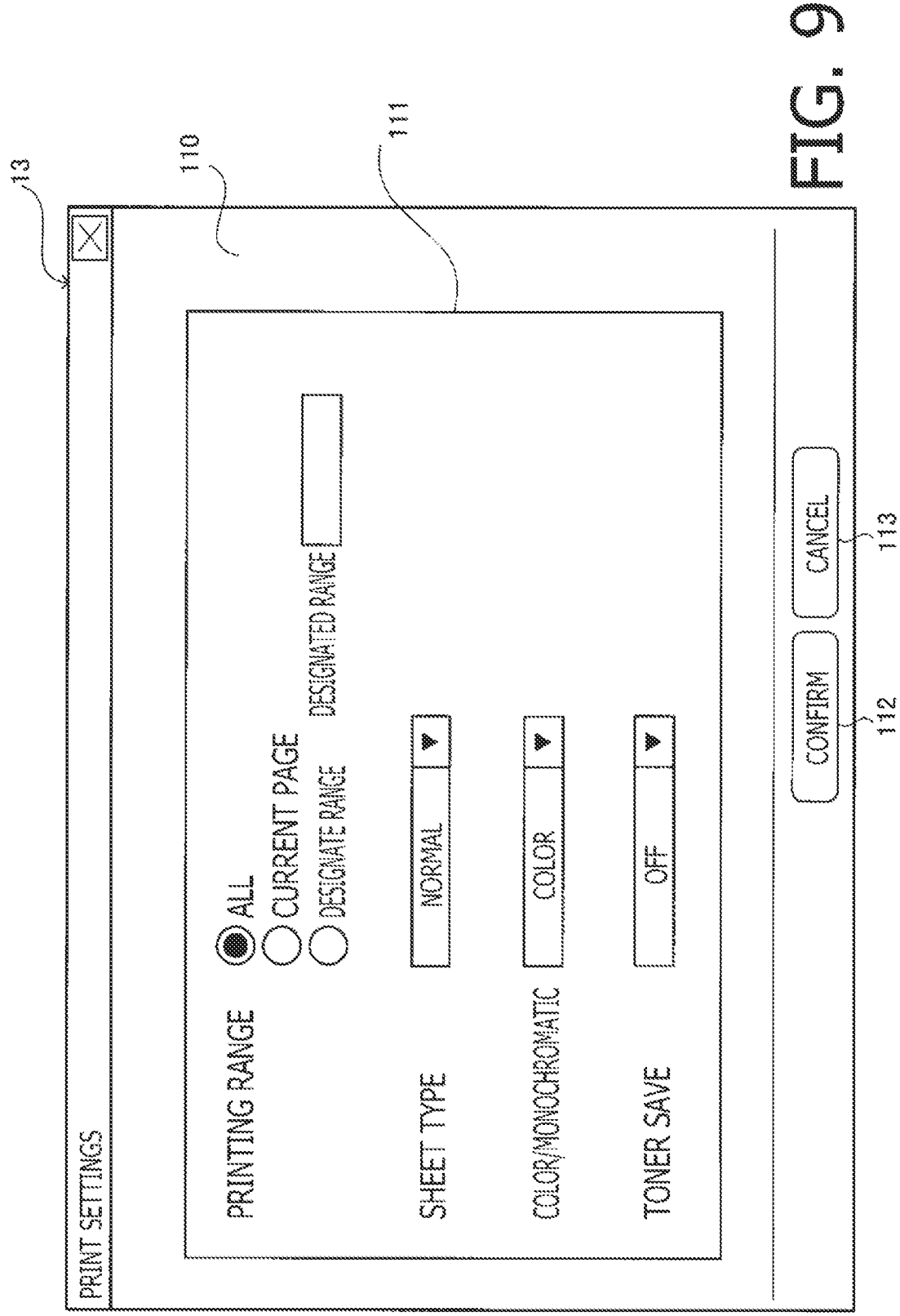
FIG. 9 is an example of a print setting screen.

On the other hand, when the confirmation button 112 of the print setting screen 11 shown in FIG. 9 is operated via the user IF 13, the CPU 11 determines that the print setting is to be confirmed (S111: confirmed) and obtains the usage condition (S113). It is noted that the process of S113 is an example of the usage condition obtaining process. For example, the CPU 11 requests the printer 2 selected in the confirmed print settings to transmit the usage condition. To the request, the user ID obtained in S107 is attached. The printer 2 that receives the request extracts the usage condition associated with the user ID received together with the request from the usage condition DB 23 and transmits the same to the PC 1. The CPU 1 receives the usage condition from the printer 2 via the communication IF 14 and stores the same in the memory 12.

The CPU 11 may obtain the usage condition from the management device 3. For example, the CPU 11 extracts the identification information of the printer 2 from the confirmed print settings, and transmits the extracted identification information of the printer 2 and the user ID obtained in S7 to the management device 3 via the communication IF 14. When the management device 3 receives the identification information of the printer 2, the management device 3 identified the usage condition DB 23 associated with the identification information of the printer 2 with referring to the usage management DB 33. Then, the management device 3 checks the received user ID against the identified usage condition DB 23 and extracts the usage condition associated with the user ID. Then, the management device 3 transmits the extracted usage condition to the PC 1. The CPU 11 receives the usage condition transmitted from the management device 3 via the communication IF 14 and stores the same in the memory 12.

After obtaining the usage condition, the CPU 11 determines whether or not printing is executable on the printer 2 (S115). It is noted that a process in S15 is an example of a determination process. In S115, the CPU 11 checks the usage condition obtained in S113 against the print settings confirmed in S111, and determines whether printing according to the confirmed print settings is executable or not.

The CPU 11 determines whether printing on the printer 2 is determined to be executable or not (S117). When the confirmed print settings satisfy all the usage conditions and when the printing on printer 2 is determined to be executable (S117: YES), the CPU 11 determines that printing is to be executed (S125) and returns to the process of FIG. 3. For example, when the print settings received from the general-use printing program 41 along with the execution instructions (i.e., the print setting which has not receive the change through the print setting screen 110 that is displayed in S109) satisfy all the usage condition, the CPU 11 determines that the printing is to be executed. Alternatively, when the print settings for which the execution instructions is received together from the general-use printing program 41 are first edited via the print setting screen 110 before the determination process of S115 is performed, the CPU 11 determines that printing is to be executed.

Figure 10:
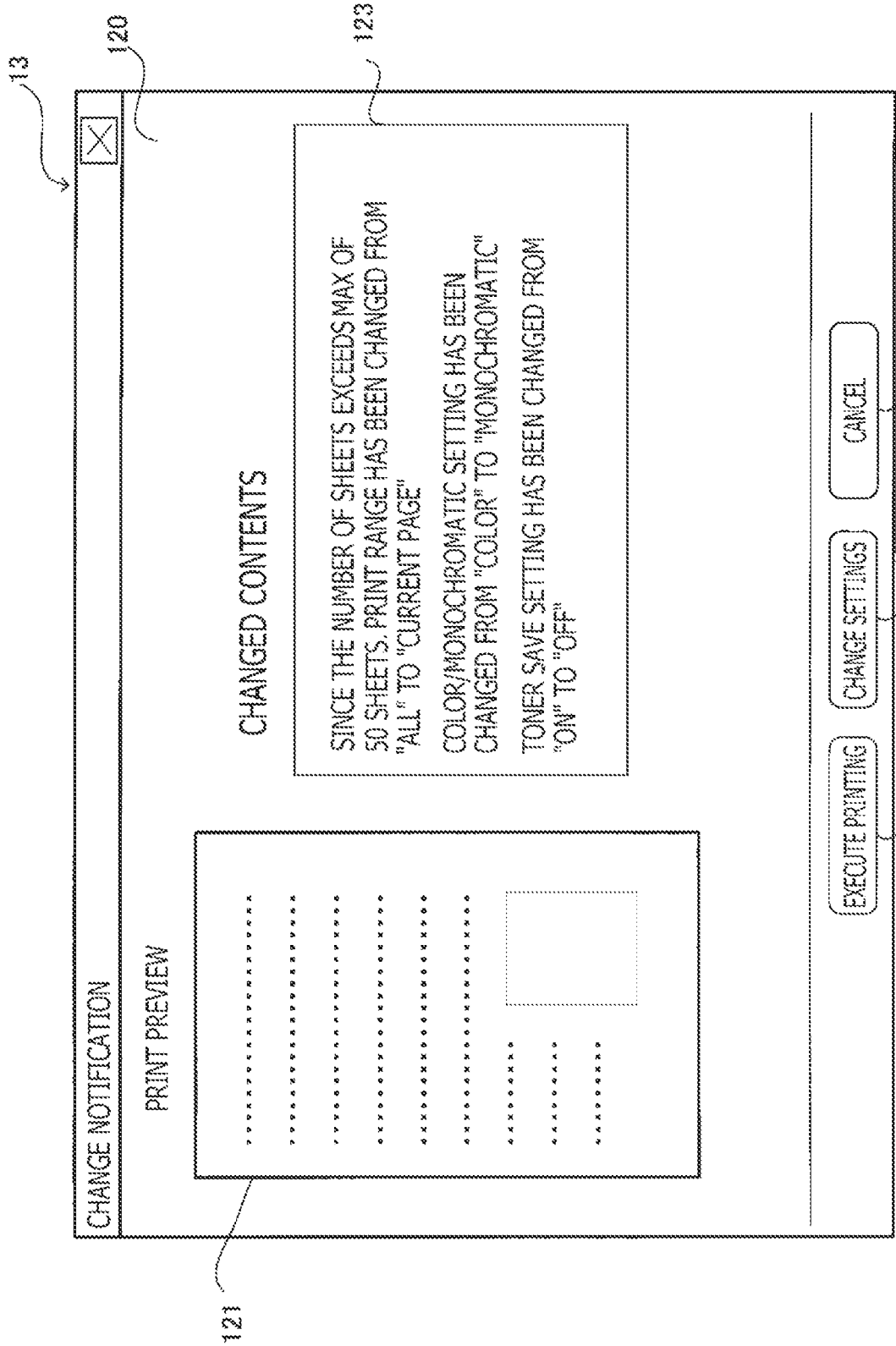
FIG. 10 is an example of a change notification screen.

On the other hand, as shown in FIGS. 8A and 8B, when the confirmed print settings do not satisfy any of the usage conditions and the printing on the printer 2 is determined to be unexecutable (S117: NO), the print settings are changed (S119). In other words, the CPU 11 changes the print settings determined in S111 to print settings that satisfy the usage conditions. It is noted that a process in S119 is an example of a change process. As shown in FIG. 10, for example, the CPU 11 displays a change notification screen 120 on the user IF 13 to notify the contents of the change (S121). It is noted that a process in S21 is an example of a notification process.

It is assumed, for example, that, as shown in FIG. 9, the user A intends to use the printer 2 to print a 100-page original document, and in a state where "all" is set to an item of the print range, "color" is set to an item of color/monochrome, and "OFF" is set to the item of the toner save, the confirm button 112 is operated by the user. As shown in FIG. 9, the usage condition of the user S is limited such that "monochrome" is set for the item of color/monochrome, and usage of color printing is restricted. In addition, the number of printable pages for the user A is limited to 50 pages, and therefore, the user A cannot perform printing 100 pages of sheets. Furthermore, for the user A, the item of the toner save included in the usage condition is set to "ON" and the printing that the toner save is not set is restricted. Therefore, the printing using the confirmed print settings cannot be executed on the printer 2.

Therefore, the CPU 11 changes the color/monochrome setting from "color" to "monochrome" according to the usage conditions. Further, the CPU 11 changes, for example, the setting of the print range from "all" to "current page." Furthermore, the CPU 11 changes the toner save setting from "OFF" to "ON."

After changing the print settings in this way, the CPU 11 displays, for example, the change notification screen 120 shown in FIG. 10 on the user IF 13. The change notification screen 120 displays a preview image 121 of the image after the change. The change notification screen 120 displays a change contents display field 123 indicating the change contents, a print execution button 124, a setting change button 125, and a cancel button 126.

The CPU 11 generates a preview image 121 by editing the intermediate image data received from the general-use printing program 41 together with the execution instruction in A04 of FIG. 3 based on the print settings after changed, and displays the generated preview image 121 on the user IF 13. As described above, the preview image 121 is displayed in monochrome since the color/monochrome setting has been changed from "color" to "monochrome." By looking at the preview image 121, the user A can recognize that the print setting has been changed from the color to monochrome setting.

When the printing range, color/monochrome, and toner save settings are changed as described above, the CPU 11 displays messages such as "Since the number of sheets exceeds max of 50 sheets, print range has been changed from all to current page" "Color/monochrome setting has been changed from 'color' to 'monochrome'," "Toner save setting has been changed from 'ON' to 'OFF'," and the like. This allows the user A to recognize the items of the print settings that have been changed and the concrete details of the changes. In particular, even for changes in print settings that are difficult to grasp from the preview image 121, such as the toner saving setting, the user can recognize the changes from the notification displayed in the change contents display field 123.

Further, it is assumed that a usage condition of a user is restricted such that only "double-sided" is set for the aggregate print setting included in the usage conditions and thus the use of single-sided printing is restricted, and the user selects "no aggregation" in the item of the aggregation print setting on the print setting screen. In this case, the CPU 11 changes the aggregation setting from "no aggregation" to "aggregation" and displays a preview image 121 of two pages of images printed on one sheet of paper and/or a notice indicating the change on the user IF 13. For another example, when only "double-sided" is set for aggregate print setting included in the usage conditions and the use of single-sided printing is restricted in a usage condition of a user, and the user selects "single-sided" in the aggregate print setting item displayed on the print setting screen, the CPU 11 changes the print setting to "double-sided printing" and notifies the user of the change. Furthermore, when, for example, a user who is restricted from printing postcards since only "plain paper" is set for printing of a specific paper type included in the usage conditions sets "postcard" for the paper type item on the print setting screen, the CPU 11 changes the paper type setting from "postcard" to "plain paper" and displays the preview image 121 with the image printed on plain paper and the details of the change are displayed on IF 13.

Figure 11:
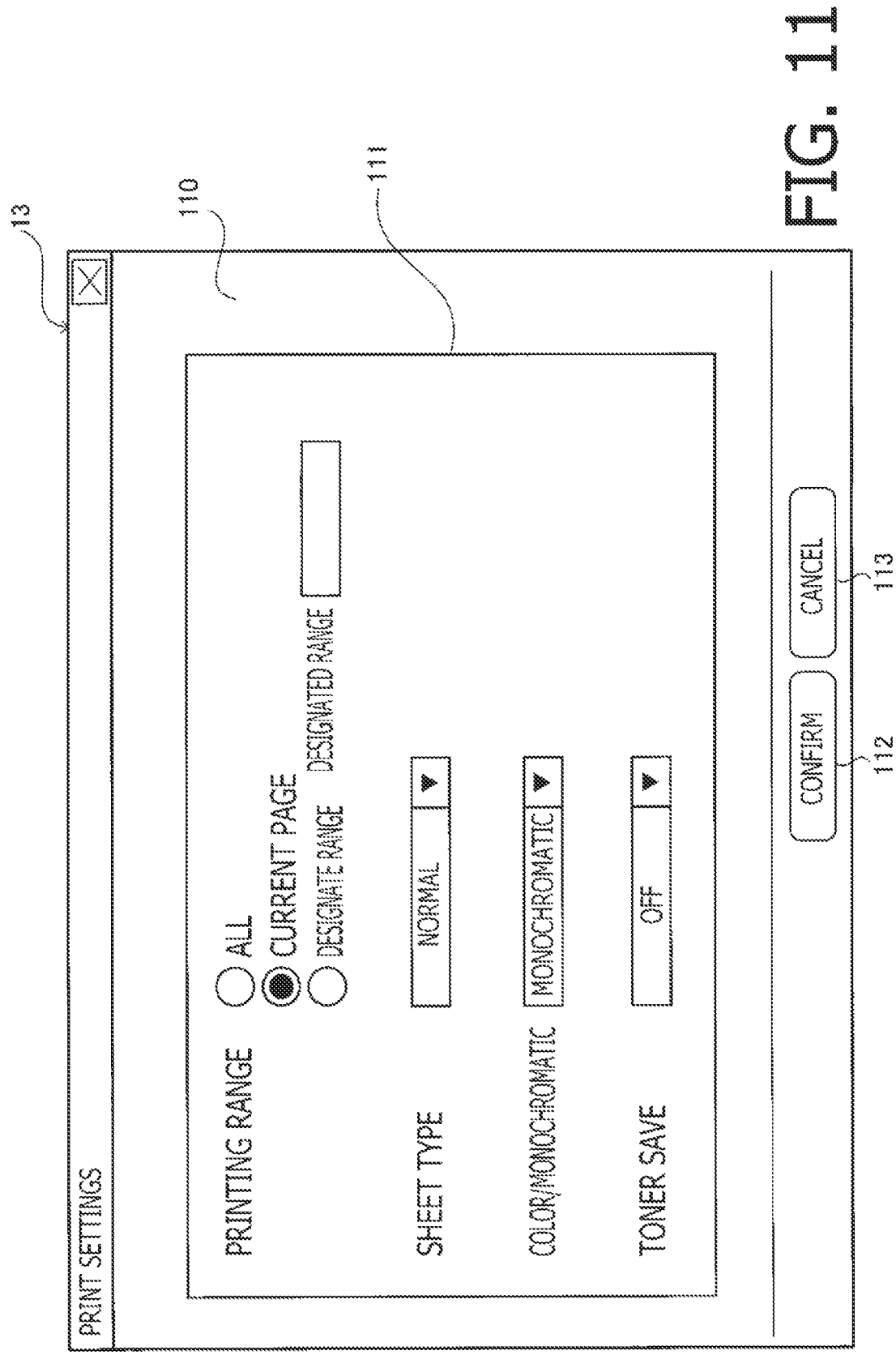
FIG. 11 is an example of a print setting screen.

The CPU 11 determines whether the instructions are received via the change notification screen 120 (S123). A process in S123 is an example of a selection process. When the CPU 11 receives the operation of the setting change button 125 via the user IF 13, the CPU 11 receives the setting change instruction (S123: setting change instruction). In this case, the CPU 11 returns to S109 and redisplays the print setting screen 110. As shown in FIG. 11, the redisplayed print setting screen 110 reflects the changed print settings. When the user A looks at the display of the change contents display field 123 of the change notification screen 120 shown in FIG. 10, and recognizes that the maximum number of printable pages is 50 pages, the user A can change the print range setting from "current page" to "designated range" via the user IF 13, enter "1-50" as the designated range, and then click the confirmation button 11 (S111: Confirmed). This allows the supporting program 42 to receive further changes to the print settings which have been automatically changed by the supporting program 42 itself.

By allowing the supporting program 42 to manually change the changed print settings, the user A can also change the print settings to another print setting that allows printing by the supporting program 42 without having to redo the print settings with use of the editing application 43, thus usability is improved.

The CPU 11 determines again whether printing can be executable based on the re-set print settings (S115). In this case, the CPU 11 may omit S113 to reduce the processing load. The CPU 11 checks the print settings after the re-setting against the usage conditions obtained for the user A, and determines whether printing on the printer 2 is executable or not. When the determination result indicates that printing is unexecutable (S117: NO), the CPU 11 changes the re-set print settings to print settings that enable printing on the printer 2 (S119), and notifies the user of the changed settings (S121). The description of the subsequent processes is omitted since they have been described above. Thus, the supporting program 42 allows the CPU 11 to send the print job to the printer 2 until the print settings meet the conditions for use by user A.

When the user A does not intend to perform printing in monochrome, the user A operates the cancel button 126 of the change notification screen 120 shown in FIG. 10 via the user IF 13. In this case, as shown in FIG. 8, the CPU 11 receives the cancellation instruction (S123: cancelation instruction), determines that the printing is canceled (S127), and returns to the process of FIG. 3. Thus, the supporting program 42 can cancel printing even after the print settings have been changed.

When the printing with the changed print settings is allowed, the user A operates the print execution button 124 of the change notification screen 120 shown in FIG. 10 via the user IF 13. When the CPU 11 receives the print execution instruction (S123: print execution instruction), the CPU 11 determines that printing is to be executed (S125) and returns to the process of FIG. 3.

As shown in FIG. 3, when determining that the printing is to be executed in the print execution determining process in A5 (alt: execute printing), the supporting program 42 generates the print data (A11). Concretely, the supporting program 42 performs rasterization based on the intermediate image data in response to the execution instruction received from the general-use printing program 41 in A04, and generates print data representing the image to be printed. The print data is data generated by rasterizing the intermediate image data using the print settings received from the general-use printing program 41 in A04 or the print settings changed (including the re-changed print settings) in S119 of FIG. 8B. The print data generated here is data in a format that can be used for printing by the printer 2. The print data is, for example, PDL data dedicated to the model of the printer 2.

As described in detail above, the supporting program 42 of the present embodiment obtains the user ID and the usage conditions corresponding to the user ID of the user when there is a print instruction to the general-use printing program 41, and determines whether the printer 2 can execute printing according to the print settings for the print instruction based on both of the obtained information. When the result of the determination indicates that printing on the printer is unexecutable, the supporting program 42 changes the print settings for the print instruction to other print settings with which the printing by the printer 2 can be performed. This makes it possible to use the printer 2 in accordance with the usage conditions set for the user concerned, and reduces the possibility that a print job is sent to the printer 2 with the print settings with which printing is unexecutable.

It is noted, for example, that S121 of FIG. 8 may be omitted, and the supporting program 42 may not provide a notification indicating the changes of the print settings before executing a process to transmit the print job to the printer 2. However, by providing a notification indicating the changes of the print settings, the user can recognize the items of the print settings that have been changed.

When the print settings are changed, the supporting program 42 may execute a process to transmit the print job to the printer 2 without receiving any cancellation instructions or instructions to further change the print settings.

By providing the print execution button 124 and the cancel button 126 to the change notification screen 120 as shown in FIG. 10 and by receiving the selection of whether to perform printing based on the changed print settings via the user IF 13, the user can confirm in advance whether to print or not when the print settings are changed, and the printing that the user does not intend can be avoided.

By providing the print execution button 124 and the setting change button 125 on the change notification screen 120 shown in FIG. 10 and by receiving the selection of whether to perform printing based on the changed print settings via the user IF 13, and when the selection not to perform printing based on the changed print settings is received, it is possible to further manually change the print settings after the change. By allowing the manual change of the print settings in this way, the print settings can be changed to other settings with which the printing can be performed.

The notification shown in FIG. 10 is an example and is not necessarily limited to this configuration. The preview image 121 generated based on the changed print settings may not be displayed on the user IF 13. It is noted, however, by displaying the preview image 121, the user can recognize in advance what kind of printing will be performed and can easily make determination whether to perform printing or not. Optionally, the preview image 121 may be displayed when the print settings that can be visibly recognized by the user, such as color printing or aggregated printing, are performed. On the other hand, when the print settings that can hardly be visibly recognized by the user, such as the toner save setting, the preview image may not be displayed. This may reduce the processing load on the supporting program 42.

What is claimed is:

1. A non-transitory computer-readable recording medium for an information processing device having a computer, the information processing device being connectable to a printer, the computer-readable recording medium containing computer-executable instructions realizing a supporting program corresponding to the printer, wherein, when a print instruction making the printer to print an image is received from an application program implemented in the information processing device for a general-use printing program embedded in an operating system of the information processing device, the computer-executable instructions cause, when executed by the computer, the information processing device to perform:

an identification information obtaining process of obtaining identification information which identifies a user;

a usage condition obtaining process of obtaining a usage condition, the usage condition being a condition used to determine whether printing is executable by the printer, the usage condition being set for each user, the usage condition obtaining process obtaining the usage condition set for the user identified by the obtained identification information; and when receiving a print instruction, a determination process of determining whether the printing is executable by the printer based on print settings of the print instruction and the obtained usage condition.

2. The non-transitory computer-readable recording medium according to claim 1, wherein the instructions cause, when executed by the computer, the information processing device to further perform, when receiving the print instruction, a notification process of notifying through a user interface of the information processing device based on a determination result of the determination process.

3. The non-transitory computer-readable recording medium according to claim 2,
wherein the instructions cause, when executed by the computer, the information processing device to further perform a management information obtaining process of obtaining management information indicating whether a restriction function of the printer is enabled or disabled, and
wherein, when receiving the print instruction:
the information processing device performs the determination process and the notification process in a case where the management information indicating that the restriction function has been enabled is obtained, and
the information processing device does not perform the determination process or the notification process in a case where the management information indicating that the restriction function has been disabled is obtained.

4. The non-transitory computer-readable recording medium according to claim 2,
wherein, in the notification process, the information processing device notifies an item of the print settings which does not satisfy the usage condition through the user interface when determining that printing is not executable in the determination process.

5. The non-transitory computer-readable recording medium according to claim 2,
wherein the instructions cause, when executed by the computer, the information processing device to further perform a changing process of receiving change of the print settings through the user interface when determining that printing is not executable in the determination process.

6. The non-transitory computer-readable recording medium according to claim 5,
wherein the information processing device performs the determination process after the changing process, and
wherein, when the print settings are changed in the changing process, the information processing device performs determining, in the determination process, whether the printing is executable by the printer based on the changed print settings and the usage condition obtained in the usage condition obtaining process, and
wherein, the instructions cause, when executed by the computer, the information processing device to further perform, when the information processing device determines that the printing is executable in the determination process performed after the changing process:
the changing process again; and
transmitting a print job of the print instruction after determining that the printing is executable.

7. The non-transitory computer-readable recording medium according to claim 2,
wherein the instructions cause, when executed by the computer, the information processing device to further perform:
not transmitting a print job of the print instruction in a state where it is determined that the printing is not executable in the determination process; and
transmitting a print job of the print instruction in a state where it is determined that the printing is executable in the determination process.

8. The non-transitory computer-readable recording medium according to claim 2,
wherein the instructions cause, when executed by the computer, the information processing device to further perform:
a storing process of obtaining multiple usage conditions of multiple users set in the printer, respectively, and storing the obtained usage condition in a memory of the information processing device; and
in the usage condition obtaining process, obtaining a usage condition associated with the identification information obtained in the identification information obtaining process, from among the multiple usage conditions stored in the storing process.

9. The non-transitory computer-readable recording medium according to claim 2,
wherein the instructions cause, when executed by the computer, the information processing device to further perform a cancellation process of cancelling printing based on the print instruction when obtaining of the usage condition is failed in the usage condition obtaining process.

10. The non-transitory computer-readable recording medium according to claim 2,
wherein, in the usage condition obtaining process, the information processing device obtains, from the printer, the usage condition associated with the identification information obtained in the identification information obtaining process, the printer storing the usage condition set by a user.

11. The non-transitory computer-readable recording medium according to claim 1,
wherein the instructions cause, when executed by the computer, the information processing device to further perform, when receiving the print instruction, a changing process of changing the print setting such that it is determined that the printing is executable by the printer in the determining process when determining that printing is not executable in the determination process.

12. The non-transitory computer-readable recording medium according to claim 11,
wherein the instructions cause, when executed by the computer, the information processing device to further perform a management information obtaining process of obtaining management information indicating whether a restriction function of the printer is enabled or disabled, and
wherein, when receiving the print instruction:
the information processing device performs the changing process and the notification process in a case where the management information indicating that the restriction function has been enabled is obtained, and
the information processing device does not perform the changing process or the notification process in a case where the management information indicating that the restriction function has been disabled is obtained.

13. The non-transitory computer-readable recording medium according to claim 11,
wherein, the instructions cause, when executed by the computer, the information processing device to further perform, when the print settings is changed in the changing process, a notification process of notifying a changed content of the print settings through a user interface of the information processing device before causing the information processing device to transmit a print job of the print instruction to the printer.

14. The non-transitory computer-readable recording medium according to claim 13, wherein the instructions cause, when executed by the computer, the information processing device to further perform:
a selection process of receiving, through a user interface of the information processing device, selection whether to execute printing based on the changed print setting when the print setting is changed in the changing process;
when receiving selection to execute printing in the selection process, transmitting a print job of the print instruction to the printer; and
when receiving selection not to execute printing in the selection process:
not transmitting the print job of the print instruction to the printer; and
a cancellation process of cancelling printing based on the print instruction.

15. The non-transitory computer-readable recording medium according to claim 13,
wherein the instructions cause, when executed by the computer, the information processing device to further perform:
a selection process of receiving, through a user interface of the information processing device, selection whether to execute printing based on the changed print setting when the print setting is changed in the changing process;
when receiving selection to execute printing in the selection process, transmitting a print job of the print instruction to the printer;
when receiving selection not to execute printing in the selection process:
not transmitting the print job of the print instruction to the printer; and
a re-changing process of receiving further changing the print setting changed in the changing process; and
the determination process of after the re-changing process,
wherein, when the print settings are re-changed in the re-changing process, the information processing device performs determining, in the determination process, whether the printing is executable by the printer based on the re-changed print settings and the usage condition obtained in the usage condition obtaining process.

16. The non-transitory computer-readable recording medium according to claim 13,
wherein, in the notification process, the information processing device displays an image based on the changed print settings on the user interface.

17. The non-transitory computer-readable recording medium according to claim 11,
wherein the instructions cause, when executed by the computer, the information processing device to further perform:
a storing process of obtaining multiple usage conditions of multiple users set in the printer, respectively, and storing the obtained usage condition in a memory of the information processing device; and
in the usage condition obtaining process, obtaining a usage condition associated with the identification information obtained in the identification information obtaining process, from among the multiple usage conditions stored in the storing process.

* * * * *